United States Patent [19]

Hosea et al.

[11] Patent Number: 5,108,615
[45] Date of Patent: Apr. 28, 1992

[54] METHOD FOR RECOVERY OF A METAL ION FROM ELECTROLESS PLATING SOLUTIONS

[75] Inventors: J. Michael Hosea; Michael D. Mayne, both of Las Cruces; Dennis W. Darnall, Mesilla, all of N. Mex.

[73] Assignee: Bio-Recovery Systems, Inc., Las Cruces, N. Mex.

[21] Appl. No.: 442,744

[22] Filed: Nov. 28, 1989

[51] Int. Cl.$^5$ .............................................. B01D 15/04
[52] U.S. Cl. .................... 210/668; 210/669; 210/688; 423/24; 423/139; 423/DIG. 14
[58] Field of Search ............... 210/681, 684, 688, 669; 423/24, 139, DIG. 14

[56] References Cited

U.S. PATENT DOCUMENTS

| | | | |
|---|---|---|---|
| 4,076,618 | 2/1978 | Zeblisky | 210/670 |
| 4,303,704 | 12/1981 | Courduvelis et al. | 210/688 |
| 4,666,683 | 5/1987 | Brown et al. | 210/681 |
| 4,778,572 | 10/1988 | Brown | 204/14.1 |

OTHER PUBLICATIONS

Clyde S. Brooks, "Metal Recovery From Electroless Plating Wastes," *Metal Finishing*, vol. 87, No. 5, pp. 33-36 (1989).

*Primary Examiner*—Ivars Cintins
*Attorney, Agent, or Firm*—Skjerven, Morrill, MacPherson, Franklin & Friel

[57] ABSTRACT

A new process for removal of a metal ion from an anionic complex, including a first chelating agent and a metal ion, such as copper, nickel or cobalt ion, in electroless plating bath rinse streams utilizes a cation exchange resin to extract the metal ion from the rinse stream after the metal ion has been removed from the anionic complex and complexed with a second chelating agent.

In another embodiment, a competing chelating agent is not added to the electroless plating bath waste stream, but rather, another metal ion (B), which has a higher affinity for the chelating agent than the metal ion (A) of interest and which is nontoxic, is added to the waste stream. Metal ion B is selected so that under predetermined conditions, metal ion B forms a stronger complex with the chelating agent than does metal ion A. Also, the complex of the chelating agent and nontoxic metal ion B is anionic. A cation exchange resin is used to extract metal ion A from the treated waste stream.

24 Claims, 1 Drawing Sheet

METHOD FOR RECOVERY OF A METAL ION FROM ELECTROLESS PLATING SOLUTIONS

BACKGROUND OF THE INVENTION

1. Field of the Invention

This invention relates generally to recovery of a metal ion from an aqueous solution and in particular to removal of copper ions and other metal ions from rinses associated with electroless (chelated) plating baths.

2. Description of the Prior Art

Electroless plating solutions typically contain salts of metals such as cobalt, copper or nickel along with a reducing agent such as sodium hypophosphite, complexing agents such as ethylenediaminetetraacetic acid (EDTA), a pH adjuster such as sodium or ammonium hydroxide and possible stabilizers such as cyanide or thiourea. The electroless plating baths contain high concentrations of chelated metal ions and are typically operated at high pH values because the chelating compounds used in the bath chemistry hold more metal ions in solution at high pH values than at low pH values.

In electroless plating, a part, such as a printed circuit board, is placed in the electroless plating bath for a period of time and after the plating process is complete, the part is usually rinsed in a flowing stream of deionized water. The rinse water is collected for treatment because the water contains complexed metal ions, usually in the form of anionic complexes, and therefore cannot be discharged directly to a drain. The use of anion exchange resins to effect the removal of the anionically charged metal ions from the rinse water is complicated by the presence of high concentrations of other anions, such as hydroxide, cyanide, complexing agents, phosphites, phosphates, carbonate and sulfate, which are typically found in the rinse water.

Conventional hydroxide precipitation systems, which operate at high pH, generally are not effective in removing the metal ions from the rinse water because the chelating agents used in electroless plating form soluble metal ion complexes, which are very stable at high pH. Alternative forms of rinse water treatments such as borohydride reduction or the use of dithiocarbamates require high chemical dosage with extremely expensive reagents. Previous attempts to use ion exchange technology in the removal of EDTA chelated metal ions, such as copper ions, from electroless plating bath rinses have been unsuccessful.

The metal ion complexes in the plating baths are usually anionic. Therefore conventional cation exchange resins are not useful for extracting the metal ions from the rinse water. Conventional anion resins would seemingly be useful but, in fact, the rinse water contains overwhelming amounts of competing anions which rapidly reduce the capacity of the anion resins to unacceptable levels. Chelating ion exchange resins have had some limited success but most chelating agents used in electroless plating baths have such high affinities for the metal ion of interest that they inhibit metal binding by the chelating ion exchange resin. As a result the binding capacities of the chelating ion exchange resins are too low to be practicable.

Thus, ion exchange resins are relatively ineffective for recovery of the metal ions from the electroless plating bath rinse water. Nevertheless, if a method could be found to use conventional ion exchange technology for the removal of complexed metal ions from the rinse water, the method would provide significant advantages over the present systems for recovery of the metal ions.

SUMMARY OF THE INVENTION

According to the principles of this invention, an aqueous solution containing complexes of metal ions such as copper, cobalt or nickel, is chemically pretreated so that the metal ions are subsequently removed from the solution by passage of the solution over a cation exchange resin. In one embodiment, a selected chelating agent is added to the aqueous solution prior to passage of the solution into an ion exchange column. The selected chelating agent has a comparable or higher affinity for the complexed metal ion than the chelating agent used in the electroless plating bath. The concentration of the selected chelating agent added to the solution is chosen so as to shift the equilibrium toward formation of the metal ion-selected chelating agent complex. Accordingly, the metal ion is liberated from the original complex and is bound to the selected chelating agent.

The selected chelating agent is chosen so that the resulting metal ion complex is positively charged. Thus, when the aqueous solution is subsequently passed through a cation exchange column, the positively charged metal ion complex is bound to the resin. The metal ion complex has a greater affinity for the cation exchange resin than other cations, such as sodium, potassium, calcium, and magnesium, in the rinse water so that the operation of the ion exchange resin column is not appreciably affected by other cations in the rinse water.

In another embodiment, a second metal ion, different from the metal ion to be recovered, is added to the aqueous electroless plating bath rinse solution and the pH of the solution adjusted so that the metal ion to be recovered, the first metal ion, is released from the complex consisting of the chelating agent and the first metal ion. Another complex consisting of the chelating agent and the second metal ion is formed. In this embodiment, the concentration of the second metal ion added to the solution if selected to shift equilibrium towards formations of the second metal ion-chelating agent complex. Thus, the first metal ion is liberated and a new metal complex is formed. The aqueous solution is subsequently passed through an ion exchange resin which binds the first metal ion. The ion exchange resin passes the metal ion complex consisting of the chelating agent and the second metal ion through the column.

DETAILED DESCRIPTION

Figure 1:
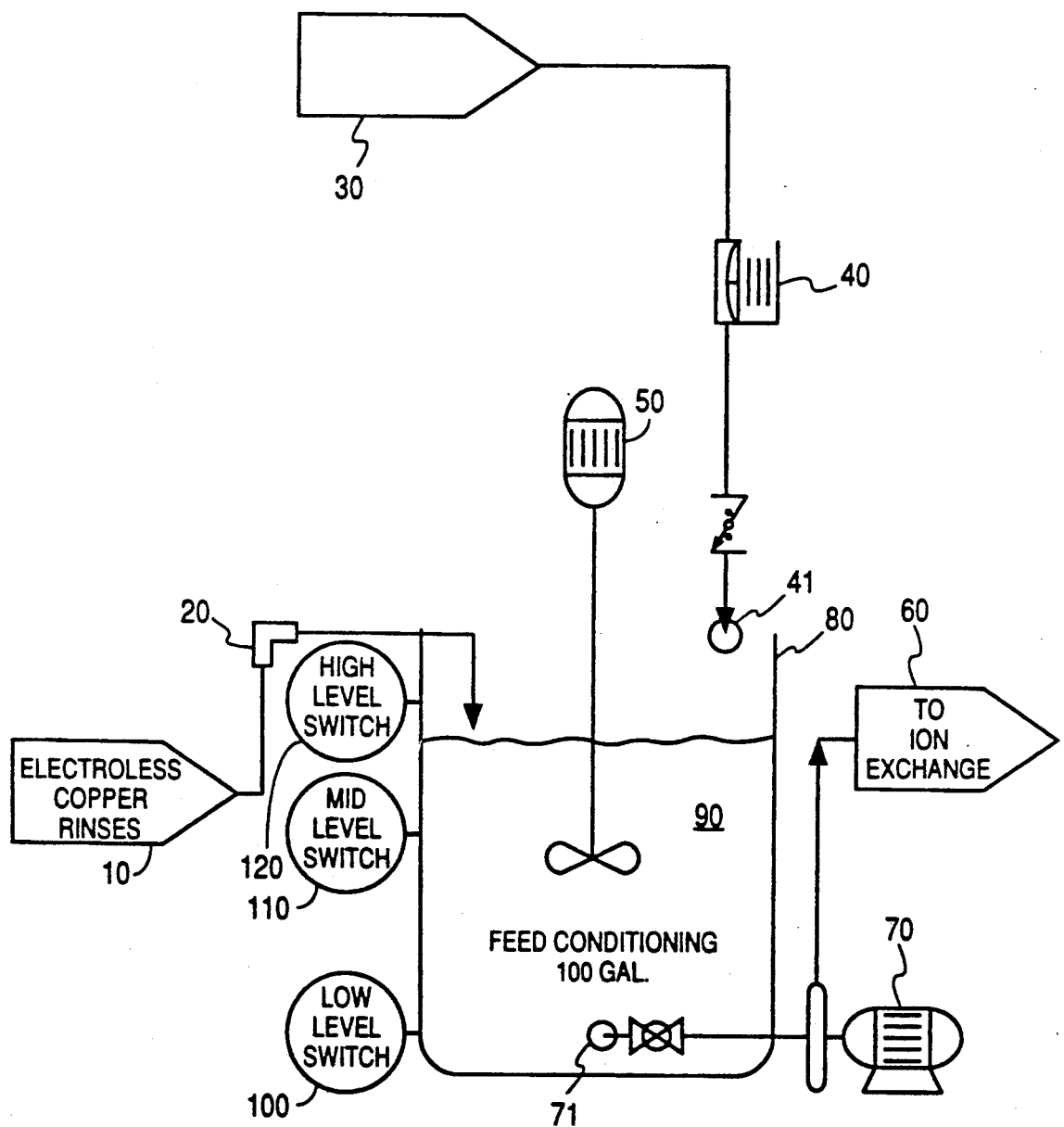
FIG. 1 illustrates one electroless plating bath rinse water system suitable for using the processes of this invention.

A new process for removal of a metal ion from an anionic complex, including a first chelating agent and a metal ion, such as a copper, nickel or cobalt ion, in electroless plating bath rinse streams utilizes a cation exchange resin to extract the metal ion from the rinse stream after the metal ion has been removed from the anionic complex and complexed with a second chelating agent. Specifically, a second chelating agent is selected such that, at a specified pH value, the formation constant for the complex consisting of the second chelating agent and the metal ion to be recovered is comparable to or greater than the formation constant for the anionic complex consisting of the first chelating agent and the metal ion to be recovered. The second chelating agent is chosen not only based upon the formation constant for the complex of the second chelating agent and the metal ion (the second complex) at the specified pH value, but also so that the second complex is cationic.

Moreover, the displacement of the metal ion by the second chelating agent can be enhanced from a kinetic and thermodynamic standpoint by adjustment of the concentration of the second chelating agent added to the rinse stream. Where M represents a metal ion, B represents the first chelating agent and C represents the second chelating agent, consider the reaction:

$$M-B+C \rightleftharpoons M-C+B \quad (1)$$

where $$M+B \rightleftharpoons M-B \quad K_{f1}$$
$$M+C \rightleftharpoons M-C \quad K_{f2}$$
$$M-B+C \rightleftharpoons M-C+B \quad K_{f2}/K_{f1}$$

Whether the reaction of Equation (1), hereinafter "reaction (1)", goes to completion as written depends upon both thermodynamic and kinetic considerations. The equilibrium constant for reaction (1) is given by ratio of the formation constant ($K_{f2}$) for the metal ion-second chelating agent complex M—C divided by the formation constant ($K_{f1}$) for the metal ion-first chelating agent complex M—B. If the equilibrium constant for reaction (1) is greater than one, then reaction (1) is favored. As the equilibrium constant increases, the tendency of the reaction to reach completion increases.

However, even if the ratio of the formation constants is less than one (which means the formation constant of the second chelating agent and the metal ion is less than the formation constant of the first chelating agent and the metal ion), reaction (1) can still be pushed to completion by increasing the concentration of second chelating agent C so that the ratio of second chelating agent C to the metal ion-first chelating agent complex M—B is higher than one. Thus, the completion of reaction (1) is rendered thermodynamically more favorable by increasing the concentration of the second chelating agent C.

By the same token, according to the laws of chemical kinetics, if the rate of the forward reaction (1) is directly proportional to reactant concentration C, then increasing the concentration of C speeds up the approach to equilibrium of reaction (1). Thus increasing the concentration of second chelating agent C over that of metal ion-first chelating agent complex M—B favors the reaction both from a kinetic and thermodynamic stand point.

According to the principles of this invention, a selected volume of the electroless plating bath rinse stream containing the complex of the first chelating agent and the metal ion (the first complex) is treated. If necessary, the pH of the solution is adjusted to the predetermined pH value, i.e. (the pH value such that the formation constant for the second complex is comparable to or greater than the formation constant for the first complex) and then the second chelating agent is added to the solution. The solution is mixed so that a homogeneous mixture is maintained.

The pH adjustment and the addition of the second chelating agent, in one embodiment, are performed sequentially, and in another embodiment are performed simultaneously. The second chelating agent, as described more completely below, is added so that a selected ratio of the first complex to the second chelating agent is achieved.

Since the second chelating agent has a greater affinity for the metal ion than the first chelating agent, the metal ion is extracted from the first complex, and the second complex is formed. The first complex was anionic, but the second complex is cationic. Hence, as the mixture is stirred and the second complex formed, the metal ion is bound in a cationic complex.

The solution is subsequently passed through a cation exchange resin bed at a selected flow rate, typically about one third bed volume per minute. Since many of the other constituents in the electroless bath rinse stream are anionic, and because the cation exchange resin has a higher affinity for the second complex than for most of the other cations in the electroless bath waste stream, the second complex containing the metal ion to be recovered is bound to the cation exchange resin and most other constituents pass through the resin bed. Hence, unlike prior art methods, the resins are not quickly saturated with contaminants. Therefore, the process of this invention provides a new capability for effectively recovering metal ions from electroless plating bath rinse streams.

In one embodiment, the contaminated waste stream from the electroless bath rinses 10 (FIG. 1) is collected in a tank 80 which has a capacity of about 100 gallons (378.5 liters). The flow of the contaminated waste stream into tank 80 is controlled by a flow switch 20 in combination with a low level switch 100, a mid-level switch 110, and a high level switch 120. The level in tank 80 is maintained between 25 and 95 gallons (95–360 liters). As the contaminated rinse water flows into tank 80, either an acid or a base is metered into the tank through pipe 41 by metering pump 40 from a reservoir 30 of the appropriate solution so that solution 90 in tank 80 has the predetermined pH value. The use of a pH control device to achieve a predetermined pH value is known to those skilled in the art.

The second chelating agent is also added to solution 90 by metering pump 40. The chelating agent that is frequently used in electroless copper plating baths is ethylenediaminetetraacetic acid (EDTA). The log of the formation constant for the complex of EDTA and copper(II) is 16.8 at pH 10. Here, pH 10 is the specified pH value. Thus, in this embodiment, the second chelating agent must form a complex with copper(II) which is cationic and the log of the formation constant for the complex at pH 10 must be comparable to or greater than 16.8. The process of this invention functions over a pH range of about 5 to about 12, but the preferred pH range is from about 8 to about 10.

The log of the formation constant for the complex of tetraethylenepentamine (tetren) with the copper(II) is 23.3 at pH 10 and the complex is cationic because the copper(II) tetren complex carries a double positive charge. Other complexing and chelating agents suitable for use in the process of this invention include pentaethylenehexamine; 1, 10-phenanthroline in combination with either diamines or triamines; 1, 4, 7, 10-tetra-azacyclodecane; other cyclic amines; crown ethers; and other thiol amines.

Tetren is added to solution 90 so that the ratio of ETDA-Cu(II):tetren is approximately 1:2. As described more completely below, other ratios are suitable for removing Cu(II) from solution 90. Mixer 50 agitates the solution in tank 80 continuously. The average residence time in tank 80 is about fifteen minutes in one embodiment, so that the copper ions are extracted from the copper-EDTA complex and are bound to the second chelating agent, tetren, while in tank 80.

The solution 90 is pumped through pipe 71 by pump 70 and passed through the ion exchange resin bed 60 which contained in one embodiment a macro-porous strong acid cation exchange resin for example, Dowex MSC-1 available from Dow Chemical Company of Midland Mich. (Dowex is the U.S. registered trademark of Dow Chemical Company of Midland, Mich.) The flow rate through ion exchange resin bed 60 is about one third bed volume per minute. The copper-tetren complex is bound to the resin and the EDTA passes through the column and may be further processed or discharged to a drain if appropriate.

After cation exchange resin bed 60 becomes saturated with the cationic copper chelate, processing is stopped and the ion exchange resin stripped. The number of bed volumes that can be passed through ion exchange resin bed 60 is determined by the concentration of the cationic copper chelate in the influent. In one embodiment, a detector, as described in copending and commonly assigned U.S. patent application Ser. No. 07/135,126, entitled "Sensor for Dissolved Substances in Fluids", now U.S. Pat. No. 4,908,676, issued Mar. 13, 1990, which is incorporated herein by reference in its entirety, was used to determine when the effluent from ion exchange resin bed 60 contained a Cu level that was unacceptable. Upon the Cu level in the effluent reaching an unacceptable level, ion exchange resin bed 60 was removed from service. The procedures for stripping the bound copper from the cation exchange resins are well known to those skilled in the art and do not form a part of this invention.

In the above embodiment, the ratio of Cu-EDTA:-tetren in solution 90 was maintained at about 1:2. However, the Cu-EDTA:tetren ratio is more generally in the range of about 1:1 to about 1:100 or even to about 1:1000. A Cu-EDTA to tetren ratio of 1:1 is satisfactory, because the formation constant for Cu-tetren is over six orders of magnitude greater that the Cu-EDTA formation constant. Thus, the ratio is preferably at least 1:1. However, higher ratios are typically used because the displacement of the metal ion is kinetically faster at higher ratios, i.e. higher concentrations of the tetren complexing agent. The higher ratios more rapidly shift equilibrium further toward the cationic complex. As the ratio increases, the cost increases and the maximum ratio is limited by the solubility of the complexing agent. Thus, the ratio is usually selected based upon economic considerations. In one embodiment, the ratio is in the range of about 1:1 to about 1:10 and preferably in the range of about 1:1 to about 1:4.

For a solution at pH 10 and a 1:3.2 ratio of Cu-EDTA:tetren (34 ppm of copper), the macro-porous strong acid cation resin (for example Dowex MSC-1 available from Dow Chemical of Midland, Mich. Dowex MSC-1 is a macroporous styrene divinylbenzene polymer functionalized with sulfonic acid groups) was used to process 50 bed volumes. There was 0.02 ppm copper in the effluent after the passage of 50 bed volumes. For a solution at pH 10 and a 1:3 ratio of Cu-EDTA:tetren (34 ppm of copper), the macro-porous strong acid cation resin was used to process 100 bed volumes. There was 0.024 ppm copper in the effluent after the passage of 100 bed volumes. Two different diluted bath solution samples with 34 ppm Cu in the form of Cu-EDTA and 2× molar tetran each gave 0.1 ppm Cu effluent levels after passage of 100 bed volumes. Since in each of the above examples, the macroporous strong acid cation ion exchange resin was not saturated, many more bed volumes of solution could have been passed through the resin prior to saturation. In contrast, for a solution at pH 10 and a 1:3.2 ratio of Cu-EDTA (30 ppm of copper), a chelating ion exchange resin (for example SR-5 available from Sybron Chemical Co., of Birmbingham, N.J.) processed only 30 bed volumes prior to breakthrough at a concentration of greater than 1 ppm.

In the previous embodiment, a competing chelating agent was used to extract the metal ions of interest from the aqueous solution. However, in another embodiment, a competing chelating agent is not added to the electroless plating bath waste stream, but rather, another metal ion (B), which has a higher affinity for the chelating agent than the metal ion (A) of interest and which is nontoxic, is added to the waste stream. Metal ion B is selected so that under predetermined conditions, described more completely below, metal ion B forms a stronger complex with the chelating agent than does metal ion A. Also, the complex of the chelating agent and nontoxic metal ion B is anionic.

The pH of the rinse solution containing the complex of the chelating agent and the metal ion A to be recovered is adjusted to the specified pH value, i.e., the predetermined pH value. The nontoxic metal ion B is then added to the solution so that a selected ratio of chelating agent-metal ion A complex to nontoxic metal ion B is achieved. Again, the pH adjustment and the addition of metal ion B can be performed either separately or simultaneously. The solution is stirred to maintain a homogenous solution so that metal ion B complexes with the chelating agent and releases metal ion A. The solution is subsequently passed over a cation exchange resin which has an affinity for metal ion A at the specified pH. Metal ion A is bound to the cation exchange resin and then recovered using methods known to those skilled in the art. The complex of the chelating agent and metal ion B is either passed to a drain or processed to break down the chelating agent.

In this embodiment, to recover copper(II) complexed with EDTA from a electroless plating bath rinse stream, the contaminated rinse stream 10 (FIG. 1) is again processed in tank 80. The competing metal ion, referred to as the nontoxic metal ion above, is added by metering pump 40 to the solution 80. In this embodiment, the pH of solution 90 is maintained at about 2 by metering an acid through metering pump 40 also.

The log of the formation constant for the complex of EDTA with copper(II) is 4.6 at pH 2 while the log of the formation constant for the complex of EDTA with iron(III) is 10.3 at pH 2. Accordingly, when iron, in the form of $FeCl_2$ is metered into solution 90, the iron displaces copper from the copper-EDTA complex and forms an iron-EDTA complex.

The average residence time in tank 80 is again about 15 minutes. Hence, solution 90 is maintained for a period of time sufficient to allow displacement of the copper ions by the iron ions and solution 90 is pumped from tank 80 by pump 70 to ion exchange resin bed 60. In one embodiment, ion exchange resin bed 60 contains a picolylamine cation exchange resin such as Dowex XFS-4195 available from Dow Chemical Company of Midland Mich.

When ion exchange resin bed 60 becomes saturated with copper, processing is stopped and the ion exchange resin stripped. The number of bed volumes that can be passed through ion exchange resin bed 60 prior to saturation depends upon the concentration of copper in the influent to bed 60.

In one embodiment, a detector, as described in co-pending and commonly assigned patent application Ser. No. 07/135,126, now U.S. Pat. No. 4,908,676, issued on Mar. 13, 1990 entitled "Sensor for Dissolved Substances in Fluids", which is incorporated herein by reference in its entirety, was used to determine when the effluent from ion exchange resin bed 60 contained a Cu level that was unacceptable. Upon the Cu level in the effluent reaching an unacceptable level, ion exchange resin bed 60 was removed 7 from service and stripped of copper.

The pH of solution 90 may range from about 1 to about 3 but preferably the pH is about 2. In one application, an electroless plating bath solution was diluted to 36 ppm copper and the ratio of Cu-EDTA:FeCl$_3$ was 1:1. The diluted solution was passed through an ion exchange column containing a picolylamine cation exchange resin. The pH of the diluted solution was varied and for each pH value, the copper in the effluent from the ion exchange column was monitored. One ppm breakthrough of Cu occurred at 0, 7, 60, and 33 bed volumes at pH 4, 3, 2, and 1.5 respectively. As used herein, breakthrough means that the metal ion concentration in the effluent from the cation exchange resin reaches the stated ppm level. Similarly, when ferrous sulfate (FeSO$_4$) was used instead of ferric chloride and the 1:1 ratio maintained with 34 ppm copper at pH 2, the effluent from the picolylamine cation exchange resin contained 0.4 ppm after forty bed volumes.

For a diluted electroless plating bath solution with 34 ppm Cu at pH 3 with a 1:5 molar ratio of Cu-EDTA:Fe (the iron being FeSO$_4$) the 1 ppm breakthrough was not reached until after passage of 104 bed volumes. For another diluted electroless plating bath solution with 34 ppm Cu at pH 2 with a copper to iron molar ratio of 1:4 (the iron being FeSO$_4$) the 1 ppm breakthrough was at 186 bed volumes. The displacement of the copper ion from the copper-EDTA structure can also be accomplished using ferric sulfate Fe$_2$(SO$_4$)$_3$ at a pH of about 2. Hence, according to the principles of this invention, an iron salt is added to the solution, or more generally, a metallic salt containing a metal having the properties described above.

In another application, a chelating ion exchange resin (the SR-5 resin cited above for example) was used and again an electroless plating bath solution was diluted to 36 ppm copper and the ratio of Cu-EDTA:FeCl$_3$ was 1:1. At pH 5, there was a steady leakage of 3.5 ppm Cu in the effluent from the chelating resin. However, at pH 4 the effluent contained 0.81 ppm after 72 bed volumes and at pH 3 the effluent contained 0.64 ppm after 80 bed volumes.

In general where A represents a metal ion, M represents the chelating agent and B represents the second metal ion and metal ion A and metal B are selected, as described above, consider the reaction:

$$A-M+B \rightleftharpoons B-M+A \qquad (2)$$

$$A+M \rightleftharpoons A-M \quad K_{f1}$$
$$B+M \rightleftharpoons B-M \quad K_{f2}$$
$$A-M+B \rightleftharpoons B-M+A \quad K_{f2}/K_{f1}$$

Whether the reaction of Equation (2), hereafter, "reaction 2", goes to completion as written depends upon both thermodynamic and kinetic considerations. The equilibrium constant for reaction (2) is given by ratio of the formation constant ($K_{f2}$) for complex B−M divided by the formation constant for complex A−M ($K_{f1}$). If this ratio is greater than one, then reaction (2) is favored. As the equilibrium constant for reaction (2) increases, the tendency of reaction (2) to reach completion increases.

However, even if the ratio of the formation constants is less than one (which means the formation constant of metal ion B and the chelating agent is less than the formation constant of the first metal ion A and the chelating agent), reaction (2) can still be pushed to completion by increasing the concentration of the second metal ion B so that the ratio of metal ion B to complex A−M is higher than one. Thus, the completion of reaction (2) is rendered thermodynamically more favorable by increasing the concentration of metal ion B.

By the same token, according to the laws of chemical kinetics, if the rate of the forward reaction (2) is directly proportional to reactant concentration B, then increasing the concentration of metal ion B speeds up the approach to equilibrium of reaction (2). Thus, increasing the concentration of metal ion B over that of complex A−M favors the reaction both from a kinetic and thermodynamic standpoint. Accordingly, concentrations of metal ion B to complex A−M can be adjusted, as described above, so that concentrations other than 1:1 can be used in the process of this invention. However, a ratio of first metal ion-chelating agent complex to the second metal ion of at least 1:1 is preferred.

In the above embodiment, iron(III) or iron(II) was used to displace copper(II) from EDTA, in another embodiment aluminum(III) could be used. In fact, any metal ion that has a greater affinity for the chelating agent in the electroless plating bath solution than the metal ion to be recovered and results either in an anionic complex or in a complex which has a low affinity for the selected ion exchange resin could be used in this process. Further, while the embodiment for an Cu-EDTA complex has been described, other metal ions typically used in electroless plating baths, for example colbalt or nickel, can also be recovered according to the principles of invention.

The principles of this invention are further illustrated by the following examples.

EXAMPLE 1

Use of Tetraethylenepentamine (tetren) to Treat Electroless Copper Rinses

A column (I.D. 0.7 cm) was filled to a bed depth of 13 cm (total bed volume of 5 ml) with Dowex MSC-1 (a macroporous strong acid cation exchange resin). The filled column was conditioned by passing in sequence through the column: 5 bed volumes of 1.0 molar sulfuric acid; 2 bed volumes of deionized water; 5 bed volumes of 1.0 molar sodium hydroxide; and 10 bed volumes of deionized water.

A commercial electroless copper plating bath solution containing EDTA was diluted with deionized water to contain 34 ppm copper at pH 10. Tetren was added to the solution at a tetren to copper ratio of 2:1. Although the interaction of tetren with the Cu-EDTA complex is almost immediate, the solution was mixed and allowed to react for about five minutes. The solution was then passed through the resin-containing column at a flow rate of approximately one third of a bed volume per minute. Effluent from the column was collected in one bed volume fractions (5 ml) and each fraction was analyzed for copper concentration using flame atomic absorption.

Selected data are shown below in Table 1 for copper concentrations in the effluent. The passage of one hundred bed volumes of the tetren treated copper-EDTA solution resulted in copper in the effluent at levels near or below the detection limit of flame atomic absorption analysis. The detection limit of flame atomic absorption is near 0.1 ppm.

TABLE 1

| Bed Volumes Passed Through Column | Copper Concentration in Effluent from Column |
|---|---|
| 10 | 0.06 |
| 20 | 0.06 |
| 30 | 0.05 |
| 40 | 0.05 |
| 50 | 0.05 |
| 60 | 0.05 |
| 70 | 0.05 |
| 80 | 0.05 |
| 90 | 0.05 |
| 100 | 0.06 |

Other experiments showed that the bound copper could be stripped from the column with 0.5-1.0M sulfuric acid.

EXAMPLE 2

Use of Ferric Chloride to Treat Electroless Copper Rinse

A column, as in Example 1, was filled with a 5 ml bed volume of Dowex XFS-4195 cation exchange resin. The filled column was conditioned by passing in sequence through the column: 5 bed volumes of 1.0M $NH_4OH$; 5 bed volumes of deionized water; 5 bed volumes of sulfuric acid; and 5 bed volumes of deionized water.

A commercial electroless copper plating bath solution containing EDTA was diluted with deionized water to contain 34 ppm of copper. The diluted copper electroless plating bath solution containing EDTA was adjusted to about pH 2 and 34 ppm of copper was pretreated with 170 ppm of iron(III) as ferric chloride. The pretreated solution was then passed through the column of the ion exchange resin which has a high affinity for copper at pH 2. Effluent from the column was collected in 1-bed volume fractions (5 ml) and each fraction was analyzed for copper. Selected data are shown in Table 2. After the passage of 150 bed volumes, the effluent contained copper at only the 1 ppm level.

TABLE 2

| Bed Volumes Passed Through the Column | Copper Concentration in Effluent from the Column |
|---|---|
| 11 | 0.06 |
| 21 | 0.05 |
| 31 | 0.07 |
| 41 | 0.09 |
| 51 | 0.11 |
| 61 | 0.16 |
| 71 | 0.21 |
| 81 | 0.27 |
| 91 | 0.35 |
| 101 | 0.45 |
| 111 | 0.07 |
| 121 | 0.30 |
| 131 | 0.60 |

TABLE 2-continued

| Bed Volumes Passed Through the Column | Copper Concentration in Effluent from the Column |
|---|---|
| 141 | 0.85 |
| 151 | 1.08 |

The copper could be stripped from the column by eluting with 1.0M $NH_4OH$.

We claim:

1. A metal ion recovery process for removal of a metal ion complexed with a first chelating agent to form an anionic complex in an aqueous solution comprising:
   adding a sufficient amount of second chelating agent to said solution to form a cationic complex of said second chelating agent with said metal ion; and
   contacting thereafter said solution with a cation exchange resin wherein said cationic complex of said second chelating agent with said metal ion is bound by said cation exchange resin thereby removing said metal ion from said solution.

2. The process of claim 1 wherein the step of adding a sufficient amount of a second chelating agent to said solution to form a complex of said second chelating agent with said metal ion is performed at a pH in the range of about 5 to about 12.

3. The process of claim 2 wherein said pH is in the range of about 8 to about 10.

4. The process of claim 3 wherein said pH is about 10.

5. The process of claim 2 wherein said metal ion consists of one of a copper metal ion, a nickel metal ion, and a cobalt metal ion.

6. The process of claim 5 wherein said metal ion is a copper metal ion.

7. The process of claim 5 wherein said metal ion is a nickel metal ion.

8. The process of claim 5 wherein said metal ion is a cobalt metal ion.

9. The process of claim 1 wherein said cation exchange resin is a macroporous strong acid cation exchange resin.

10. The process of claim 1 wherein the amount of the second chelating agent added to said solution is such that a ratio of the (metal ion-first chelating agent):-(second chelating agent) is the range of about 1:1 to 1:4.

11. The process of claim 10 wherein said ratio is about 1:2.

12. The process of claim 1 wherein the amount of the second chelating agent added to said solution is such that a ratio of the (metal ion-first chelating agent):-(second chelating agent) is at least 1:1.

13. A metal ion recovery process for removal from an aqueous solution of a metal ion complexed with a first chelating agent to form an anionic complex comprising:
   maintaining said solution at about a predetermined pH value;
   adding a sufficient concentration of a second chelating agent to said solution to form a cationic complex containing said metal ion; and
   contacting thereafter said solution with a cation exchange resin wherein said cationic complex is bound by said cation exchange resin.

14. The process of claim 13 wherein said predetermined pH value is in the range of about 5 to about 12.

15. The process of claim 14 wherein said pH is in the range of about 8 to about 10.

16. The process of claim 15 wherein said pH is about 10.

17. The process of claim 13 wherein said metal ion consists of one of a copper metal ion, a nickel metal ion, and a cobalt metal ion.

18. The process of claim 17 wherein said metal ion is a copper metal ion.

19. The process of claim 17 wherein said metal ion is a nickel metal ion.

20. The process of claim 17 wherein said metal ion is a cobalt metal ion.

21. The process of claim 13 wherein said cation exchange resin is a macroporous strong acid cation exchange resin.

22. The process of claim 13 wherein the concentration of the second chelating agent added to said solution is such that a ratio of (metal ion-first chelating agent) to (second chelating agent) is the range of about 1:1 to 1:4.

23. The process of claim 22 wherein said ratio is 1:2.

24. The process of claim 13 wherein the concentration of the second chelating agent added to said solution is such that a ratio of (metal ion-first chelating agent) to (second chelating agent) is at least 1:1.